US011096225B2

(12) United States Patent
Kuo et al.

(10) Patent No.: US 11,096,225 B2
(45) Date of Patent: Aug. 17, 2021

(54) METHODS, APPARATUSES AND SYSTEMS DIRECTED TO RESOURCE SOLICITATION FOR FOG-RAN

(71) Applicant: IDAC Holdings, Inc., Wilmington, DE (US)

(72) Inventors: Ping-Heng Kuo, Bristol (GB); Jaehyun Ahn, Eunpyeong-gu (KR); Alain Mourad, Staines-Upon-Thames (GB); Janet Stern-Berkowitz, Little Neck, NY (US)

(73) Assignee: IDAG HOLDINGS, INC., Wilmington, DE (US)

( * ) Notice: Subject to any disclaimer, the term of this patent is extended or adjusted under 35 U.S.C. 154(b) by 0 days.

(21) Appl. No.: 16/443,209

(22) Filed: Jun. 17, 2019

(65) Prior Publication Data
US 2019/0394812 A1    Dec. 26, 2019

Related U.S. Application Data

(60) Provisional application No. 62/690,218, filed on Jun. 26, 2018.

(51) Int. Cl.
*H04W 76/10* (2018.01)
*H04W 68/00* (2009.01)
(Continued)

(52) U.S. Cl.
CPC .......... *H04W 76/10* (2018.02); *H04W 68/00* (2013.01); *H04W 74/0833* (2013.01); *H04L 67/10* (2013.01); *H04W 84/042* (2013.01)

(58) Field of Classification Search
CPC ....... H04W 76/18; H04W 8/30; H04W 24/08; H04W 88/085; H04W 40/02;
(Continued)

(56) References Cited

U.S. PATENT DOCUMENTS 10,523,592 B2 * 12/2019 Byers ................. H04L 47/823
2012/0281566 A1 * 11/2012 Pelletier ............... H04W 76/27
370/252

(Continued)

OTHER PUBLICATIONS

IEEE 1934-2018—IEEE Standard for Adoption of OpenFog Reference Architecture for Fog Computing, https://standards.ieee.org/standard/1934-2018.html, Aug. 2, 2018, 6 pages.
(Continued)

*Primary Examiner* — Oussama Roudani
(74) *Attorney, Agent, or Firm* — Volpe Koenig

(57) ABSTRACT

Methods, apparatuses, systems, etc., directed to resource solicitation for Fog Radio Access Network (RAN) are disclosed herein. For some embodiments, a wireless transmit receive unit (WTRU) may receive a Fog-Resource Solicitation, for example included in a paging message, for joining a Fog Radio Access Network (RAN) platform (e.g., soliciting resources). The WTRU may accept or decline the Fog-Resource Solicitation, for example, based on any of the solicited resources and the WTRU status. In case the WTRU accepts the fog-Resource Solicitation, the WTRU may establish a connection to the RAN for indicating an acceptance of the Fog-Resource Solicitation. In case the WTRU declines the Fog-Resource Solicitation, the WTRU may ignore the Fog-Resource Solicitation or respond to the Fog-Resource Solicitation by establishing a connection to the RAN, indicating a declination of the solicitation. For some embodiments, a WTRU may trigger sending a RRC-Connection Release Request to e.g., terminate the WTRU's connection to the network. The WTRU may transmit an information indicating the reasons why the WTRU is disconnecting from the network.

20 Claims, 10 Drawing Sheets

(51) Int. Cl.
*H04W 74/08* (2009.01)
*H04L 29/08* (2006.01)
*H04W 84/04* (2009.01)

(58) Field of Classification Search
CPC .... H04W 76/19; H04W 84/18; H04L 1/0076; H04L 1/0041; H04L 45/16; H04L 2001/0097
See application file for complete search history.

(56) References Cited

U.S. PATENT DOCUMENTS

| | | | | |
|---|---|---|---|---|
| 2013/0343256 | A1* | 12/2013 | Zakrzewski | H04W 4/70 370/312 |
| 2017/0279968 | A1* | 9/2017 | Fadili | H04N 7/147 |
| 2018/0109428 | A1* | 4/2018 | Kattepur | H04L 41/145 |
| 2019/0116631 | A1* | 4/2019 | Talebi Fard | H04W 68/02 |
| 2019/0245806 | A1* | 8/2019 | Hanes | H04L 67/28 |
| 2019/0335414 | A1* | 10/2019 | Rasanen | H04W 8/10 |

OTHER PUBLICATIONS

Li Jun et Al. "Resource Management in Fog-Enhanced Radio Access Network to Support Real-Time Vehicular Services", May 14, 2017, 2017 IEEE 1s International Conference on Fog and Edge Computing, pp. 68-74.

Mung Chiang Et Al.,Fog and IoT: An Overview of Research Opportunities, IEEE Internet of Things Journal; vol. 3 , No. 6 (Available at https://ieeexplore.ieee.org/document/7498684), Dec. 2016, 11 pages.

An Xingshuo et Al., "Hypergraph Based Radio Resource Management in 5G Fog Cell", Intelligent Virtual Agent, IVA 2015, Lecture Notes Computer, Springer, Berlin, vol. 10874, Chap. 1, No. 558, Jun. 13, 2018, pp. 1-13.

5G Coral: A 5G Convergent Virtualised Radio Access Network Living at the Edge, 5G Coral Project—available at http://5g-coral.eu/, Sep. 1, 2017, 5 pages.

Haijun Zhang Et Al.,Fog Radio Access Networks: Mobility Management, Interference Mitigation and Resource Optimization, Available at https://arxiv.org/abs/1707.06892v1, Jul. 20, 2017, 18 pages.

Multi-access Edge Computing (MEC), https://www.etsi.org/technologies/multi-access-edge-computing, 5 pages.

OpenFog Consortium, https://www.openfogconsortium.org/, 5 pages.

Carlos J. Bernardos Et Al.,Service Function Chaining Use Cases in Fog RAN, IETF Meeting 98, SFC WG, Chicago, USA (available at https://datatracker.ietf.org/meeting/98/materials/slides-98-sfc-sfc-use-cases-fog-ran-00.pdf), Mar. 2017, 12 pages.

3rd Generation Partnership Project; Technical Specification Group Services and System Aspects; System Architecture for the 5G System; Stage 2 (Release 15), 3GPP TS 23.501 V15.1.0, Mar. 2018, 201 pages.

Liu Qianyu et Al., "Task Scheduling in Fog Enabled Internet of Things for Smart Cities" 2017 IEEE 17th International conference on Communication Technology (ICCT), IEEE, Oct. 27, 2017, pp. 975-980.

\* cited by examiner

METHODS, APPARATUSES AND SYSTEMS DIRECTED TO RESOURCE SOLICITATION FOR FOG-RAN

CROSS REFERENCE TO RELATED APPLICATION

This application claims the benefit of U.S. Provisional Application No. 62/690,218, filed 26 Jun. 2018, the contents of each of which are incorporated by reference herein.

BACKGROUND

Both cloud computing and fog computing provide storage, applications and data to end users. Cloud computing may be seen as the practice of using a network of remote servers hosted on the internet to store, manage and process data rather than a local server or a personal computer. Fog computing may be seen as facilitating the operation of compute, storage, and networking services between end devices and cloud computing data centers. While edge computing may be referred to the location where services may be instantiated, fog computing may imply distribution of the communication, computation, and storage resources and services on or close to devices and systems in the control of end-users. Fog computing may be seen as having a closer proximity to end users and a larger geographical distribution than cloud computing.

SUMMARY

Methods, apparatuses, systems, etc., directed to resource solicitation for Fog Radio Access Network (RAN) are disclosed herein. For some embodiments, a wireless transmit receive unit (WTRU) may receive a Fog-Resource Solicitation, for example included in a paging message, for joining a Fog Radio Access Network (RAN) platform (e.g., soliciting resources). The WTRU may accept or decline the Fog-Resource Solicitation, for example, based on any of the solicited resources and the WTRU status. In case the WTRU accepts the Fog-Resource Solicitation, the WTRU may establish a connection to the RAN for indicating an acceptance of the Fog-Resource Solicitation. In case the WTRU declines the Fog-Resource Solicitation, the WTRU may ignore the Fog-Resource Solicitation or respond to the Fog-Resource Solicitation by establishing a connection to the RAN, indicating a declination of the solicitation. For some embodiments, a WTRU may trigger sending a RRC-Connection Release Request to e.g., terminate the WTRU's connection to the network. The WTRU may transmit an information indicating the reasons why the WTRU is disconnecting from the network.

The entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—may only properly be read as being constructively preceded by a clause such as "For some embodiments, . . . ." For brevity and clarity of presentation, this implied leading clause is not repeated in the detailed description of the drawings.

DETAILED DESCRIPTION

Example Networks for Implementation of the Embodiments

A wireless transmit/receive unit (WTRU) may be used as a user equipment (UE), a drone, or a wireless device in embodiments described herein.

Figure 1A:
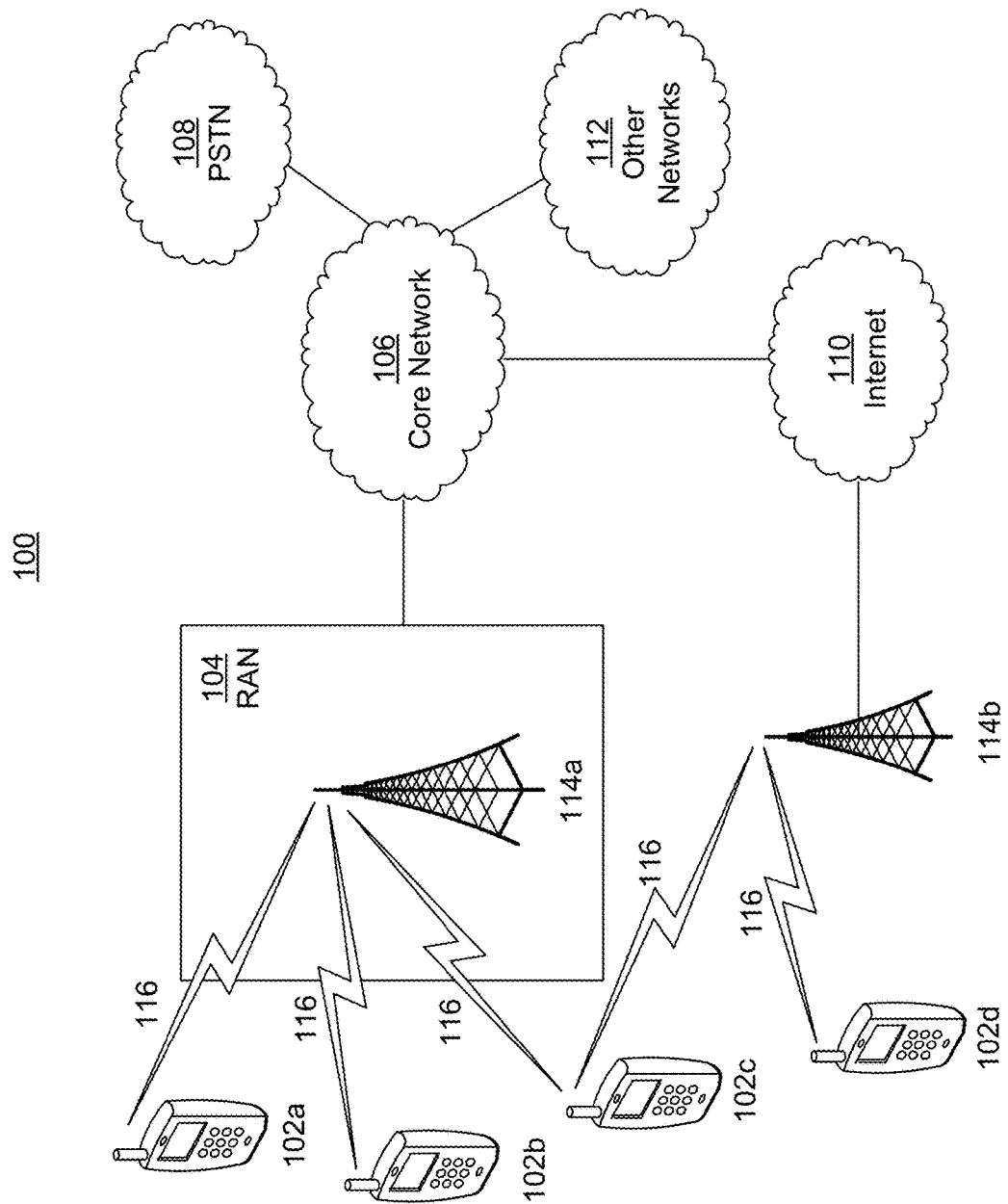
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like.

For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
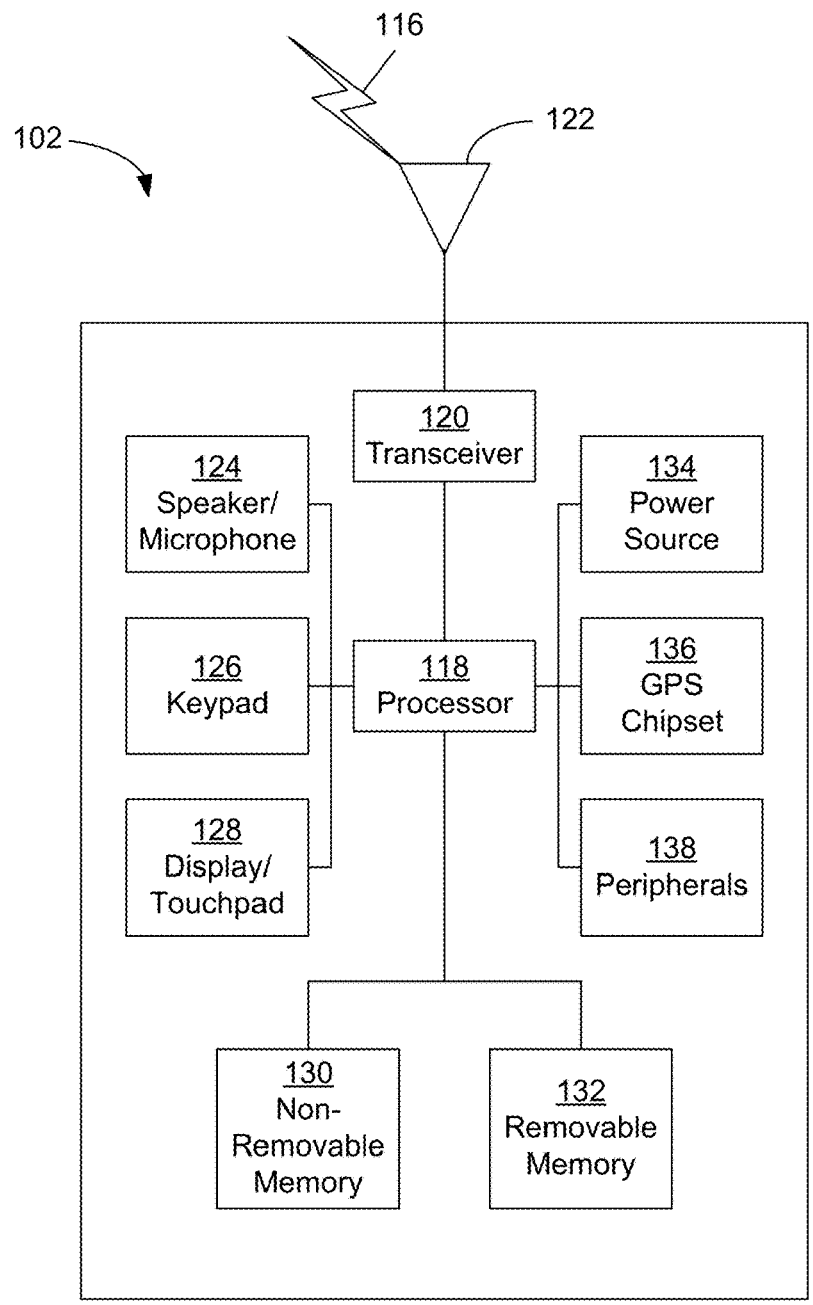
FIG. 1B is a system diagram illustrating an example wireless transmit/receive unit (WTRU) that may be used within the communications system illustrated in FIG. 1A according to an embodiment.
Figure 1C:
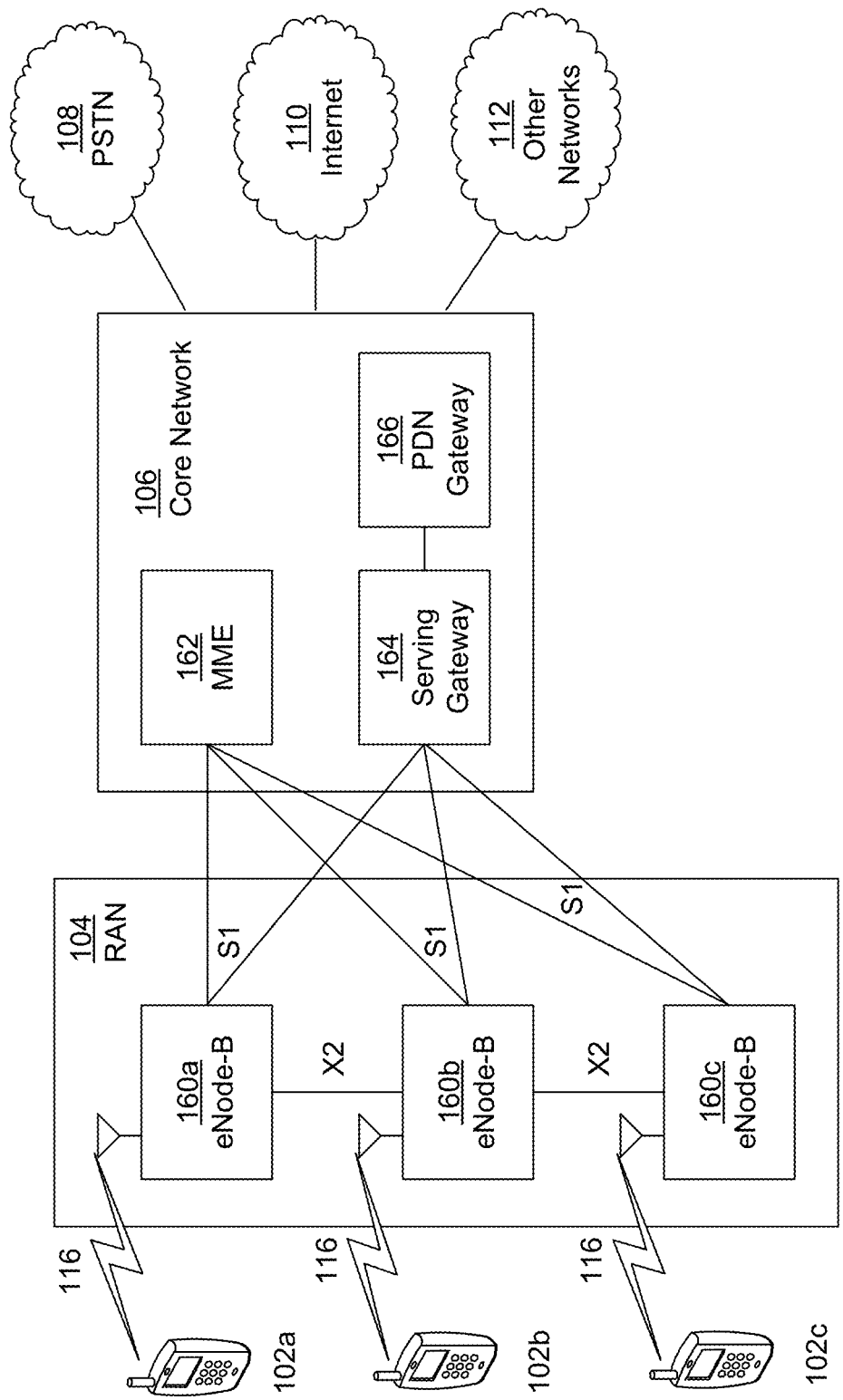
FIG. 1C is a system diagram illustrating an example radio access network (RAN) and an example core network (CN) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
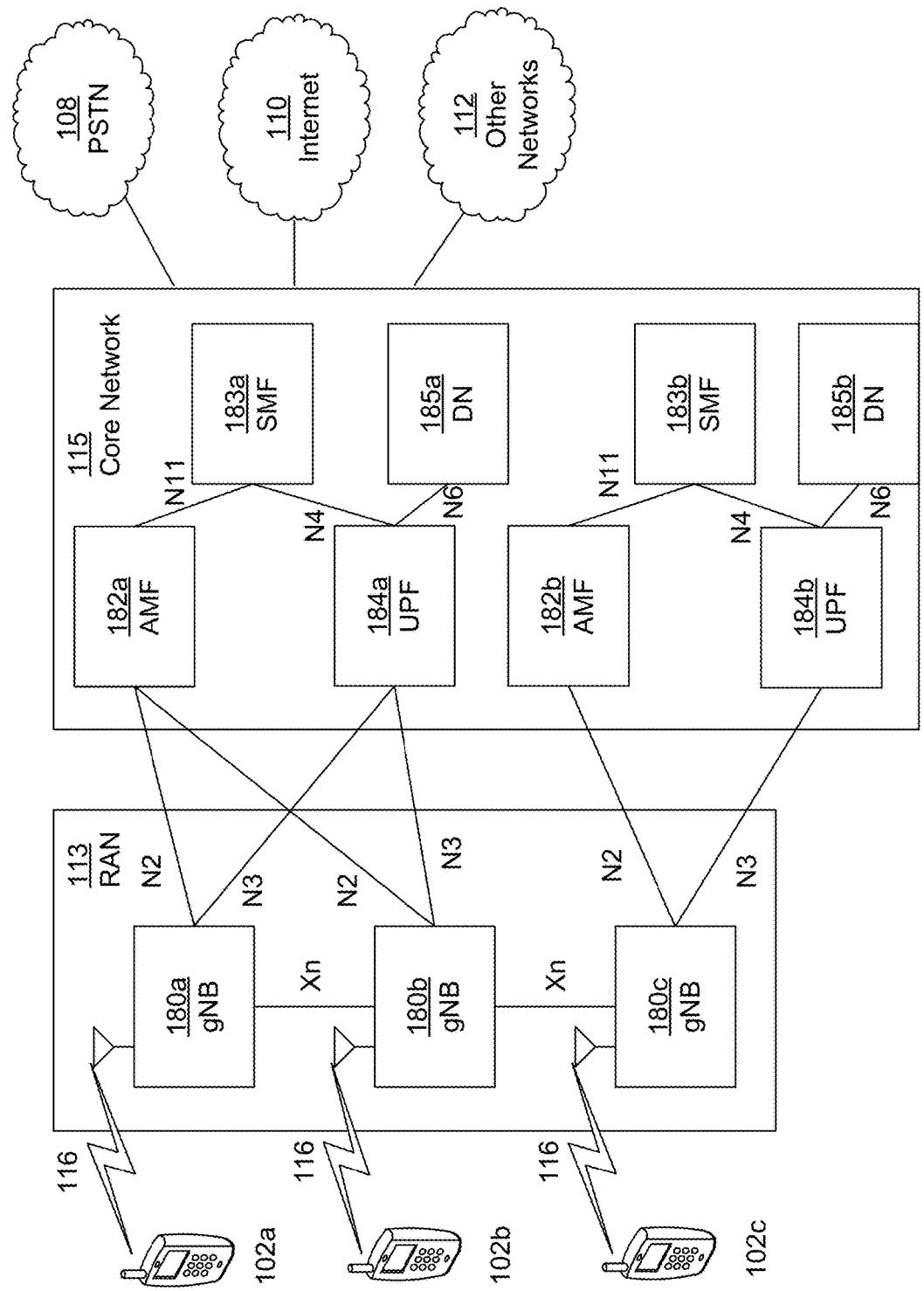
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Fog Computing and 5G Networks

Some networks (e.g., 5G networks) may enable users to receive locally-cached data, for example, instead of (or in addition to) fetching information from distant data center or cloud servers, which may reduce any of latency and bandwidth requirements to transport data over the end-to-end network infrastructure. 3rd Generation Partnership Project (3GPP) has specified that connectivity to Local Area Data Networks (LADN) to receive location-specific data (such as for enterprise networks, stadiums, or special events) be opened (e.g., only) to users within corresponding areas.

LADN network elements may be located at the network edge and may include data caching. Computing capabilities may be further integrated into the LADN to realize (e.g., mobile) edge computing and facilitate various types of (e.g., computing) task offloading.

The use of (e.g., computing, networking, storage) resources of mobile devices in proximity to the end user may allow for Fog computing. The term "Fog" may refer to a networked computational resource, for example, between things (e.g., network attached devices and/or nodes) and a cloud. A Fog node may be an infrastructure network node such as any of an eNB, a gNB, and edge server. A Fog node may also be a mobile terminal node such as any of a laptop, a smartphone, an on-board computing unit, a vehicle, and a drone (which may be more generally referred to herein as a WTRU). Fog computing may be applied to RAN virtualization, which may be referred to as a Fog-RAN, where any of computing, networking, and storage resources in proximity to users may be used to instantiate RAN functions.

For some embodiments, a LADN (e.g., as defined by 3GPP) may be a logical entity that may be distributed across multiple (e.g., physical) locations. For some embodiments, a LADN (e.g., as defined by 3GPP) may be extended to support tasks such as, for example, any of network function virtualization (NFV) and network slicing. A logical computing facility (e.g., a software package) such as a (e.g., 3GPP LADN) logical entity, that may be hosted on (e.g., multiple) computing substrates, distributed across (e.g., multiple interconnected processing) devices located at multiple locations may be referred to herein as a "Fog-RAN system".

Figure 2:
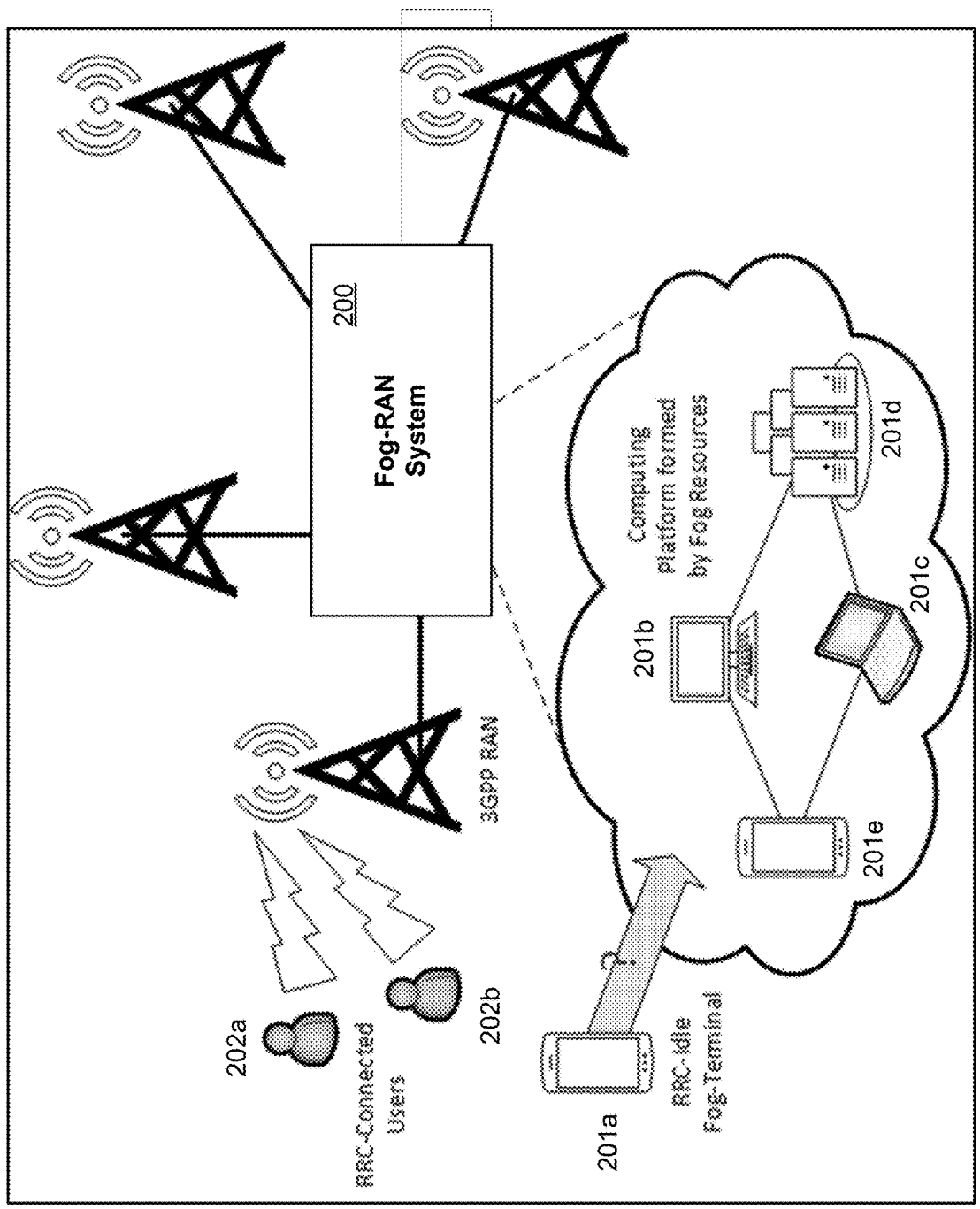
FIG. 2 is a diagram illustrating an example system of connections for a Fog-RAN system with a WTRU in an idle mode.

FIG. 2 is a diagram illustrating an example system of connections for a Fog-RAN system 200 network with a WTRU 201a in idle mode. An idle mode may be referred to herein as any of a RRC-Idle mode, an inactive mode, and a sleep mode. FIG. 2 shows a Fog-RAN system 200 with 3GPP Radio Access Network (RAN) regions connected to connected (e.g., RRC-Connected) Users 202a, 202b. A Fog-RAN system may be formed of Fog-Resources, for example, including any of desktop computers 201b, laptops 201c, servers 201d, and WTRUs 201e. A Fog-RAN system may send (e.g., transmit) a request for a resource to a Fog terminal (e.g., a WTRU 201a) in RRC-Idle mode to perform a RAN function.

For some embodiments, a Fog-RAN system may be controlled by (e.g., solely) the operator. and the Fog-RAN system may be used (e.g., only) for executing network operation functionalities. For some embodiments, (e.g., third-party) applications may be executed if (or as long as) those applications are authorized by the operator. For example, instead of relying solely on static substrates, such as data centers and cloud servers, to host RAN functions, a Fog-RAN system may use any of computing, networking, and storage resources of any of non-mobile devices, constrained (e.g., mobile) devices and mobile devices (e.g., WTRUs). A constrained device may be, for example, a resource constrained device, such as e.g., a battery powered device, which power resource may be constrained by the capacity of the battery. For example, a network may integrate (e.g., any of computing, networking and storage) resources, such as those of a WTRU, into the Fog-RAN system to save energy, to off-load computing tasks, and/or to handle increased traffic, for example.

For energy saving, a network may deactivate some servers, and the (e.g., computing) resources may be compensated by utilizing Fog WTRUs. A network may utilize (e.g. activate, run) resources of WTRUs, for example, to perform lower priority (e.g., non-critical) computing tasks without strict delay requirements, such as, for example, any of data analytics and model training for machine/deep-learning. A network may allocate resources (e.g., dynamically), and the Fog-RAN system may be scaled up or down according to traffic demands in different areas.

A WTRU may provide assistance (e.g., contribute resources) to the Fog-RAN (e.g., only) in case the WTRU is not engaged in (e.g., executing, processing) other tasks. In case a WTRU is busy, for example, transmitting or receiving data, the WTRU may be less likely to offer (e.g., provide, contribute) spare processing power to the Fog-RAN (e.g., the Fog-RAN system). For adding more resources in the Fog-RAN (e.g., in the Fog-RAN system), the network may send requests (e.g., solicitations) to WTRUs, for example, currently in an idle mode (which may be referred to herein as any of a RRC-Idle mode, an inactive mode, and a sleep mode). For some embodiments, devices in a connected mode (which may be referred to herein as any of a RRC-Connected mode, an active mode, and a connected mode) may also be used (e.g., integrated into the network, included in the contributed resources). Candidate WTRUs may be registered to the core network, and the network may have data including the capabilities of these WTRUs (for example obtained through a capability discovery procedure).

As discussed hereinbelow, a WTRU may be requested (e.g., solicited by the network) to offer (e.g., provide, contribute some of its) resources to a Fog-RAN system, and a WTRU may respond to such requests by transmitting an indication of whether the WTRU accepts to contribute resources to the Fog-RAN system or not.

For some embodiments, a 3GPP paging message may be used (e.g., transmitted) to request a Fog-Resource from WTRUs in RRC-Idle mode. Requests (e.g., solicitations) for Fog-Resources on (e.g., 3GPP) WTRU(s) may be in a paging message format with, for example, any of a list of WTRUs to be solicited, a (e.g., desired) location, a type of task(s), and (e.g., an amount of) resources. For some embodiments, additional information in a paging downlink control information (DCI) related to Fog-Resource Solicitation may enable a WTRU to save battery, for example, by enabling the WTRU to not read (e.g., receive, decode) associated physical downlink shared channel (PDSCH)/ paging messages in case the WTRU may not support (or reject, ignore) the solicitation. For some embodiments, a WTRU may receive from the network a Fog-Resource Solicitation, which may be any of a paging DCI and a paging message. The WTRU may determine feasibility (e.g., capability) on whether to join the Fog-RAN system based on the WTRU's status and/or information from the network. For example, in case a WTRU receives a request for a resource associated with the WTRU (e.g., in the WTRU), including information indicating any of an amount of resources, a task type, and a target location, the WTRU may decide to join the Fog-RAN system and establish a connection to the RAN on a condition that the WTRU is capable of providing (e.g., determines to provide, offer, contribute) the requested resource according to any of an availability of the amount of resources associated with the WTRU, a capability of the WTRU to execute (e.g., perform)) the task type in the WTRU and a location of the WTRU.

For some embodiments, the WTRU may respond to the Fog-Resource Solicitation by transmitting a signal indicating an acceptance of the solicitation. The WTRU may receive further details relating to tasks assignment via, for example, RRC messages. The WTRU may respond to the Fog-Resource Solicitation by declining the solicitation. For some embodiments, declining the solicitation may be done by neglecting (e.g., ignoring, not responding to) the solicitation. For some embodiments, declining the solicitation may include transmitting a signal indicating a declination of the solicitation, for example, which may include providing reasons of the declination to the network. For acceptance or declination, the WTRU may perform any of a random access channel transmission and an RRC connection establishment with the network. Portions of a random access procedure (e.g., preambles, resources, and the content of signaling messages described herein) may indicate accept, decline, and/or reasons associated with the acceptance and/or declination.

Paging Message with Fog-Resource Solicitation

Considering WTRUs in RRC-Connected mode may (e.g., already) be performing (e.g., processing, executing) tasks, a network may (e.g., prefer to) solicit WTRUs in RRC-Idle mode for joining (e.g., contributing, participating) in the Fog-RAN system. For some embodiments, the paging mechanism in the 3GPP network may be used to solicit devices to join the Fog-RAN (e.g., the Fog-RAN system). The paging mechanism may allow a network to communicate with WTRUs in idle mode. The paging mechanism may also allow a network to communicate with WTRUs in connected mode. Indeed, a WTRU in a connected mode may monitor paging messages for receiving, for example, system information modifications. Transmitting a paging message indicating a Fog-Resource Solicitation may allow a network to communicate with WTRUs in any of an idle mode and a connected mode (e.g., both RRC-Idle and RRC-Connected modes). For some embodiments, the Fog-RAN system may monitor and/or be aware of WTRUs in connected mode and may monitor paging messages transmitted in the network.

For some embodiments of a network, such as a 3GPP cellular network, in case the WTRU is in RRC-Idle mode, the WTRU may follow a (e.g., pre-configured) discontinuous-reception (DRX) cycle and (e.g. periodically) wake up from sleep mode to monitor any of a downlink control signal or channel (e.g., any of a physical downlink control channel (PDCCH) and an enhanced physical downlink control channel (EPDCCH)), for example, to check if the WTRU is being paged by the network. In case the WTRU receives a PDCCH with the cyclic redundancy code (CRC) masked and/or scrambled by a WTRU identity (e.g., its own Paging Radio Network Temporary Identifier (P-RNTI)), the WTRU may decode the associated data channel (e.g., PDSCH). The PDSCH may carry any of a paging message and a Paging Channel (PCH). For example, the control channel and data channel may be in the same subframe. The paging message may include information including any of Paging Records (e.g., identifying which WTRUs are being paged) and Paging Causes (e.g., information indicating why the WTRUs are being paged). The WTRUs may react (e.g., perform different operations) according to the paging cause. For instance, in case the WTRU is being paged for system information modification, the WTRU may acquire or re-acquire at least some system information, for example, using the system information acquisition procedure. In another example, in case the WTRU is being paged for an Earthquake and Tsunami Warning, the WTRU may acquire or re-acquire the system information (e.g., SystemInformationBlock Type 1), for example, immediately.

For some embodiments, a paging message (e.g., format and/or content) may include information for solicitation (e.g., recruitment, requesting) of fog (e.g., any of computing, networking and storage) resources. An information element (IE) may be included in the paging message to enable the WTRU to receive an indication that the WTRU is being paged for a resource solicitation. The information or information element may be included in (e.g., added to) the paging message.

For some embodiments, an example of a paging message may include any of the following information: a Paging Record, a Paging Record for Fog-Resource Solicitation, additional information for a Fog-Resource Solicitation, a Paging Cause. A Paging Record may include the identities (e.g., identifiers) of WTRUs that are being paged by the network for upcoming traffic. The identities may be based on any type of suitable identifier, such as a System Architecture Evolution-Temporary Mobile Subscriber Identity (S-TMSI) and an International Mobile Subscriber Identity (IMSI). A Paging Record for Fog-Resource Solicitation may include the identities (e.g., identifiers) of WTRUs that are being paged by the network for Fog-Resource Solicitation. The WTRU identities included in a Paging Record for Fog-Resource Solicitation may be based on any suitable type of identifier (e.g., a S-TMSI, an IMSI, etc.). Additional information for Fog-Resource Solicitation may include information on any of a (e.g., desired, requested, target) location, (e.g., types of) applications/functions to be launched (e.g., executed, processed by the WTRU), availability of (e.g., an amount of) a requested resource, and a request for responses of declination (in case the WTRU declines solicitation). A paging cause (or paging causes) may include information on any of a system information modification, an earthquake and tsunami warning system (ETWS) indication, a commercial mobile alter system (CMAS) indication, and a Fog-Resource Solicitation. For some embodiments of a paging cause for a Fog-Resource Solicitation, a (e.g., single) indication may be used indicate that the (e.g., entire) paging message is for a Fog-Resource Solicitation. In other words, the (e.g., single) indication of the Fog-Resource Solicitation paging cause may indicate that (e.g., all) the WTRUs, for example, for which identities are included in the paging message (e.g., included in a list of WTRU identities) are being paged for a Fog-Resource Solicitation. For some embodiments, for a paging cause for a Fog-Resource Solicitation, an indication may be used to indicate which WTRU(s) (e.g., WTRU identities) of the paging message is (are) being paged for a Fog-Resource Solicitation. The WTRU identities of the paging message may be included in any of a paging record and a paging record for resource solicitation information elements.

For some embodiments, a (e.g., separate) Paging Record may list (e.g., include) the identities, (e.g., identifiers, IDs) of WTRUs used for Fog solicitation. For example, a Paging record information element, referred to herein as "Paging Record for Fog-Resource Solicitation" information element, may list (e.g., include) the identities, (e.g., identifiers, IDs) of WTRUs used for Fog solicitation. The Paging Record for the Fog-Resource Solicitation information element may be included in the paging message in addition to a Paging Record for upcoming traffic that may include identities, (e.g., identifiers, IDs) of the WTRUs having upcoming traffic. A WTRU may be able to determine if the WTRU is being paged for a Fog-Resource Solicitation (e.g., rather than for upcoming traffic) by decoding the paging message for some embodiments.

For some embodiments, an information or an information element (IE) may be included in the paging message to indicate an (e.g., any) additional information relating to a Fog-Resource Solicitation. For example, the additional information may include information on any of a (desired, requested, target) location, a type of task (e.g., applications/ functions) to be launched, an amount of (requested) resources, and a request for responses of declination.

Location Information

Information indicating a (e.g., target, desired) location of a solicited resource may be provided to the WTRU, for example, using an information element (IE), such as an existing IE and/or an additional (e.g., new) IE. For some embodiments, a paging message may be transmitted over a (e.g., whole, more than one) tracking area (TA), and Fog-Resources may be requested in places located in a (e.g., smaller) portion of the TA (e.g., the resources may be requested for use within proximity to a (e.g., specific) WTRU). The network may take the locations of prospective Fog-Resources into account for making (e.g., transmitting requests including) solicitations via a paging message. A network may, for example, serve (e.g., a multitude of) autonomous WTRUs (in addition to WTRUs carried by people), including, for example, various types of Autonomous Guided Vehicles (AGVs) and Unmanned Aerial Vehicles (UAVs), which may maneuver to different locations. In case the Fog-RAN system is requesting more (e.g. computing) resources than may be offered (e.g., provided, contributed, made available) by the WTRUs, information relating to (e.g., desired, requested, target) locations of these resources may be provided in a location information and/or information element of the paging message. AGVs and/or UAVs receiving a paging message including a Fog-Resource Solicitation may maneuver (e.g., move) to such (e.g., desired, requested, target) locations. For some embodiments, movement of the AGVs and/or UAVs may occur in case the AGVs and/or UAVs receive approval to share any of their computing, storage, and networking resources as a part of the Fog-RAN system.

Type of Task Information

Information indicating (e.g., computing) tasks (or applications/functions to be executed) may be provided to the WTRU, for example, using an information element (IE), such as an existing IE and/or an additional (e.g., new) IE. For some embodiments, depending on the type of (e.g., computing, sensing) tasks (or applications/functions to be executed), the WTRU may determine whether or not to execute such tasks based on the configuration (e.g., capabilities) of the WTRU. For some embodiments, depending on any of the type tasks (or applications/functions to be executed) and on a permission to execute such type of task, the WTRU may determine whether or not to execute a task. The WTRU may, for example, deny permission to execute a task of a (e.g., specific) type, if executing the task type would violate any of its subscription and privacy/regulatory policy. For example, the WTRU may have (e.g., certain) modules (e.g., any of sensor, camera, data analytics module, image processing module, virtualization capabilities, hardware accelerators) tailored for specific functions and/or applications. Requests for tasks related to such modules (capabilities) may be approved by a WTRU on a condition that the WTRU supports the corresponding module (capability). In a first example, related to adaptive 360-degree video streaming, a WTRU may be equipped with a module (e.g., sensor) configured to measure the viewing orientation of the WTRU and transmit viewing orientation measurements to the Fog-RAN system for carrying out adaptive streaming. In a second example, a WTRU may be equipped with any of sensors and cameras, that may be configured to transmit any of sensing and imaging data to the Fog-RAN system for further processing. These sensing/imaging data may be directed to other WTRUs that may be equipped with, for example, any of data analytics and image recognition modules. In a third example, WTRUs may be equipped with any of fast virtualization capabilities (e.g. Kernel Virtual Machine—KVM) and hardware accelerators (e.g. Graphic Processing Unit (GPU), FPGA, ASIC) and may be selected by the network to host (e.g., perform, execute) virtualized networking functions requiring high speed processing (e.g. Virtualized Packet Data Convergence Protocol (PDCP), Virtualized MAC).

Resource Availability Information

Information indicating an amount of (e.g., minimum, required) solicited resources may be provided to the WTRU, for example, using an information element (IE), such as an existing IE and/or an additional (e.g., new) IE. For some embodiments, the network may receive information (e.g., an information element (IE)) relating to computing capabilities of a WTRU. A WTRU in idle mode may not be available when the paging message is sent. For example, the WTRU in idle mode may be processing some tasks, and may be unavailable for executing additional tasks. For some embodiments, the network may indicate an amount of (e.g., minimum, required) resources in the paging message (e.g., in additional information included in the paging message). For some embodiments, the resource availability information (e.g., included in an information element for resource availability) may indicate a (e.g., minimum) threshold for a resource parameter. The resource availability information (e.g., an IE including resource availability information) may be included in the paging message. The resource parameter may be any of a processing, memory, storage, and networking (e.g., latency, bandwidth) parameter. The WTRU may use a factor (e.g., parameter values) included in any of the resource availability information or information element together with its own status (e.g., processing context) for determining whether or not to join (e.g., participate in, contribute to, accept the request from) the Fog-RAN system.

Request for Responses of Declination Information

For some embodiments, a Declination of a Request for Resources information (e.g., included in an IE) may indicate whether or not the network is requesting that the WTRU(s) paged for Fog-Resource Solicitation provide a response in case such solicitation is declined. Such an information or IE may allow the network to know and/or determine the reasons why WTRUs decline solicitations and to determine the (e.g., list of) WTRUs that may be paged for a Fog-Resource. For some embodiments, a WTRU, receiving a request for response of declination, and deciding to decline a request for a Fog-Resource may respond by transmitting to the network a signal indicating the reason(s) of the declination. For some embodiments, a WTRU, receiving a request for response of declination, and deciding to decline a request for Fog-Resources may (e.g., decide to) not respond to (e.g., ignore) the request for Fog-Resources based on the status of the WTRU. For some embodiments, the network may indicate (e.g., transmit a signal indicating) the request for a declination response as part of a configuration such as, for example, a higher layer configuration (e.g., via any of a broadcast, an RRC, and a dedicated signaling).

Figure 3:
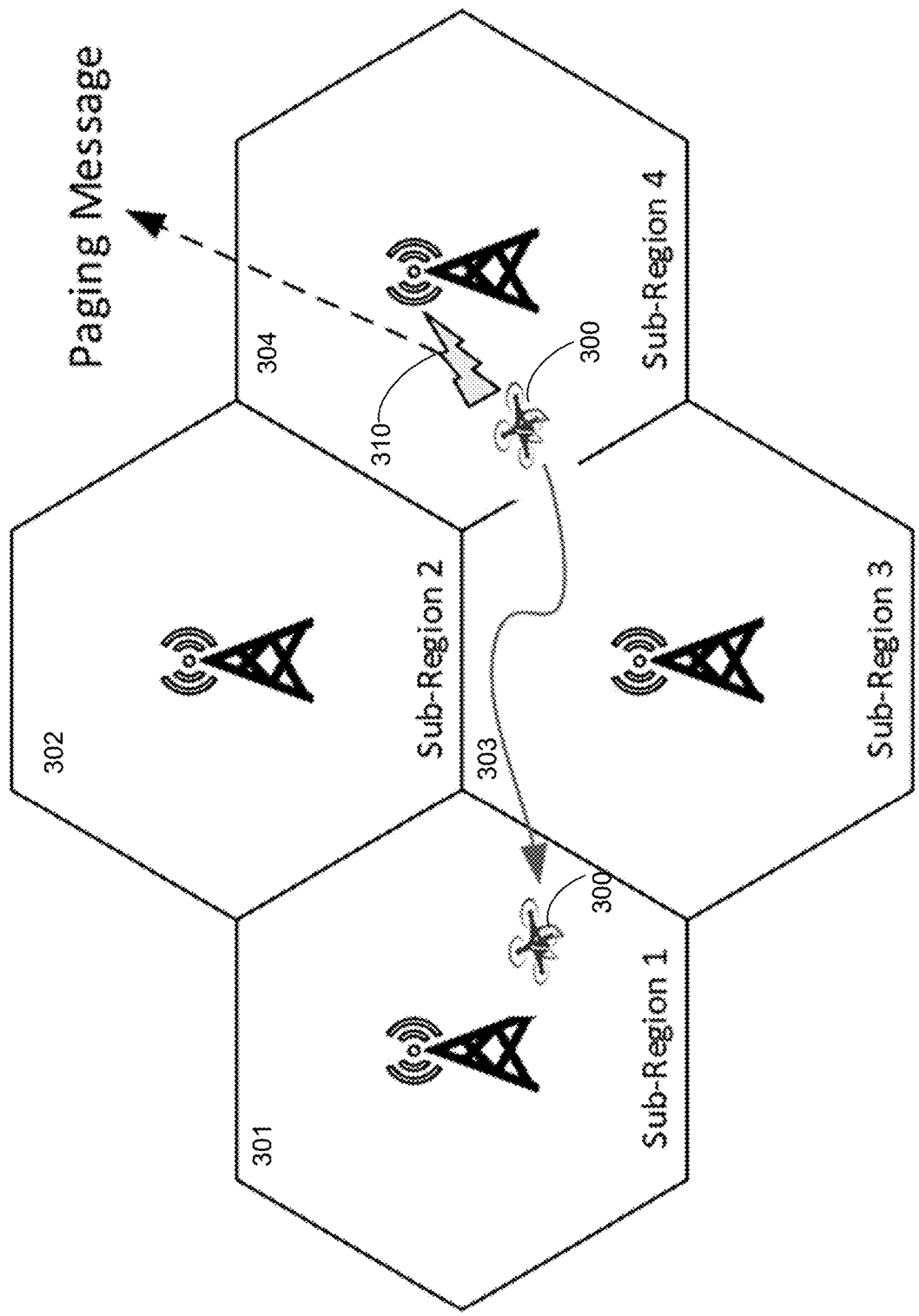
FIG. 3 is a diagram illustrating an example drone moving between sub-regions of a tracking area and receiving a paging message.

FIG. 3 is a diagram illustrating an example drone 300 moving between sub-regions 301, 302, 303, 304 of a tracking area and receiving a paging message 310. For some embodiments, the (e.g., desired, requested, target) location may be indicated using an index, for example, representing a sub-region within a tracking area. The network may configure the WTRU with (e.g., a list of) sub-regions, for example, along with their indices. For example, such a list may be communicated (e.g., transmitted) to the WTRU when (e.g., after) the WTRU is registered to the network (e.g., for the first time, or at any suitable time). For example, a sub-region may be defined as the coverage of a base station. For the case illustrated in FIG. 3, the tracking area may include four sub-regions 301, 302, 303, 304, and a (e.g., each) sub-region may correspond (e.g., be equivalent) to the coverage area of a base station (e.g., a cell of the base station). In the case of FIG. 3, a WTRU (e.g., a mobile Fog-Resource, a drone) in sub-region 304 may receive a paging message 310 indicating that Fog computing resources are requested for sub-region 301. In case the WTRU accepts such solicitation, the WTRU may, e.g., autonomously, maneuver (move) to sub-region 301 for further procedures and/or (e.g., receiving a signal indicating further) instructions for joining the Fog-RAN system.

For some embodiments, an indication of a (e.g., desired, requested, target) location may be included as an indicator within a downlink (DL) control channel (e.g., any of a PDCCH and an EPDCCH). For some embodiments, an indication of a (e.g., desired, requested, target) location may be included as an indicator within a DCI. The WTRU may be able to determine the location (e.g., the sub-region 301, 302, 303, 304 as shown in FIG. 3) of a request (or requirement) for Fog-Resources from (e.g., by checking) information included in any of the control channel or DCI (e.g., instead of from the whole paging message). A WTRU may skip decoding the paging message in case the WTRU determines (e.g., from DCI) that the WTRU is unable to offer Fog-Resources. For example, the WTRU may determine that the (e.g., desired, requested, target) location does not match the current location of the WTRU and may determine that the WTRU is not able to offer the requested Fog-Resource. In a further example, the WTRU may determine that the (e.g., desired, requested, target) location does not match the current location of the WTRU, and that moving to the (e.g., desired, requested, target) location to provide a Fog-Resource is infeasible. Such a determination may save energy (such as battery life). For some embodiments, different (e.g., desired, requested, target) locations may be distinguished by using different identifiers, such as Radio Network Temporary Identifiers (RNTIs) or different types of P-RNTIs.

For some embodiments, based on the Paging Record for Fog-Resource Solicitation in the paging message, along with information such as any of a (e.g., desired, requested, target) location, type of applications/functions, and the amount of (e.g., minimum) resource requirement (or a minimum threshold for a resource parameter), the WTRU may be able to determine whether the WTRU may accept the Fog-Resource Solicitation (e.g., be integrated into (or join) the Fog-RAN system) or not. For example, the WTRU may decide to join the Fog-RAN system and establish a connection to the RAN on a condition that the WTRU is capable of providing (e.g., determines to provide, offer, contribute) the requested resource according to any of an availability of the amount of resources associated with (e.g., in) the WTRU, a capability of the WTRU to execute (e.g., perform) the task type and a location of the WTRU.

Alternative Paging Message Formats for Fog-Resource Solicitation

For some embodiments of the paging message described above, a WTRU in idle mode may wake up and decode a paging message in case (e.g., whenever) a downlink control channel (e.g., any of the PDCCH and the EPDCCH) includes the CRC masked and/or scrambled with an identifier of the WTRU (e.g., a P-RNTI, such as its own P-RNTI, a group identifier, etc.). For some embodiments, the WTRU may wake up and decode the paging message, for example, regardless of the reason for which the WTRU is being paged (e.g., regardless of whether the WTRU is being paged for upcoming traffic and/or a Fog-Resource Solicitation). For some embodiments, using multiple (e.g., different) paging message formats as described herein may be used, for example, to improve battery efficiency of the WTRUs. Some examples of paging message formats are listed in Table 1.

TABLE 1

Contents Relating to Paging Records for Paging Message Formats

| Paging Message Format | Contents Relating to Paging Records |
|---|---|
| 1 | Paging Record for Upcoming Traffic |
|   | Paging Record for Fog-Resource Solicitation |
| 2 | Paging Record for Fog-Resource Solicitation Only |
| 3 | Paging Record for Upcoming Traffic Only |

For some embodiments, receiving an indicator in the DCI carried by (e.g., included in) a downlink control channel (e.g., the PDCCH) may notify WTRUs which paging information and/or paging message format may be conveyed in the associated downlink channel (e.g., PDSCH, in that subframe of the PDSCH). A WTRU may determine whether or not to decode the paging message based on the indicator. For example, a WTRU not supporting Fog computing may (e.g., decide to) not decode the paging message that may be indicated (e.g., by the DCI) as being (e.g., solely) for Fog-Resource Solicitation. In another example, a WTRU may not decode the paging message that may be indicated as being (e.g., solely) for Fog-Resource Solicitation, in case the WTRU, does not have sufficient (e.g., available) resources to assist the network. Such a process may be used to save battery.

For some embodiments, RNTIs, such as any of Fog-Resource Solicitation-Format 1-Paging RNTI (FRS-F1-P-RNTI) and Fog-Resource Solicitation-Format 2-Paging RNTI (FRS-F2-P-RNTI), may be used (e.g., transmitted) to indicate any of a paging message format or contents and whether the paging message contains Fog-Resource Solicitation (e.g., only and/or in addition to paging for upcoming traffic, such as an incoming call).

A WTRU with Fog computing capability may check the CRC masking/scrambling of the PDCCH, which may be masked/scrambled by any of a P-RNTI, a FRS-F1-P-RNTI, and a FRS-F2-P-RNTI. For example, in case the PDCCH CRC is masked/scrambled by a P-RNTI, the PDSCH indicated by the PDCCH may communicate (e.g., transmit) a paging message that may include a paging record for upcoming traffic only (e.g., see paging message format 3 in Table 1). In case the PDCCH CRC is masked/scrambled by a FRS-F1-P-RNTI, the PDSCH indicated by the PDCCH may communicate (e.g., transmit) a paging message that may include a paging record for upcoming traffics and for Fog-Resource Solicitation. In case the PDCCH is masked/scrambled by a FRS-F2-P-RNTI, the PDSCH indicated by the PDCCH may communicate (e.g., transmit) a paging message that may include a paging record for Fog-Resource solicitation only (e.g., see paging message format 2 in Table 1). Examples of values for a FRS-F1-P-RNTI and a FRS-F2-P-RNTI are listed in Table 2.

TABLE 2

Values for RNTIs

| Value (Hexadecimal) | RNTI |
|---|---|
| 0x0000 | N/A |
| 0x0001 to 0xFFEF | RA-RNTI, Temporary C-RNTI, C-RNTI, CS-RNTI, TPC-CS-RNTI, TPC-PUCCH-RNTI, TPC-PUSCH-RNTI, TPC-SRS-RNTI, INT-RNTI, SFI-RNTI, and SP-CSI-RNTI |
| 0xFFF0 to 0xFFFB | Reserved |
| 0xFFFC | FRS-F1-P-RNTI |
| 0xFFFD | FRS-F2-P-RNTI |
| 0xFFFE | P-RNTI |
| 0xFFFF | SI-RNTI |

Fog-capable WTRUs may check the CRC masking/scrambling multiple times to determine the type of identifier (e.g., RNTI) that may be masking/scrambling the PDCCH CRC, and to determine the corresponding paging message information and/or format that may be carried by (e.g., transmitted in) the PDSCH. For some embodiments, such an operation may not be performed by some WTRUs, such as e.g., legacy WTRUs that may not have the capabilities to recognize or use Fog-RAN mechanisms.

WTRU Response to a Fog-Resource Solicitation

For some embodiments, a WTRU having received a Fog-Resource Solicitation a paging message may (e.g., begin to) determine feasibility of accepting a solicitation from the network and/or offering WTRU resources for the Fog-RAN system. For some embodiments, the feasibility determination may be based on any of a service-level agreement (SLA) with the network, a resource availability, a location availability, a power status, and a mobility state.

A Service-Level Agreement (SLA) with the network may be part of a service subscription plan. For example, a client may receive a less expensive subscription fee if the WTRU offers (e.g., contributes) its resources to the Fog-RAN system. For example, according to a WTRU configuration (e.g., derived from a subscription plan), a WTRU may make some of its resources available to the Fog-RAN system, and may have a reduced subscription fee according to the amount of resources made available. In other words, in case the WTRU receives a Fog-Resource Solicitation (e.g., in a paging message) corresponding to an amount of resources currently available in the WTRU, the WTRU may decide to accept the solicitation and may establish a connection to the RAN, for example, to contribute resources to the Fog-RAN system.

For some embodiments, a WTRU may (e.g., decide to) accept or decline a Fog-Resource Solicitation, received in a paging message, according to a (e.g., current) resource availability. For instance, a WTRU in idle mode may be executing some (e.g., other) computing tasks that may not be associated with the RAN. The WTRU may not have any available resource (e.g., to contribute to the Fog-RAN system). For example, in case the WTRU receives a Fog-Resource Solicitation (e.g., in a paging message) corresponding to an amount of resources which are not currently available in the WTRU, the WTRU may decide to decline the solicitation. In another example, in case the WTRU receives a Fog-Resource Solicitation (e.g., in a paging message) corresponding to an amount of resources which are currently available in the WTRU, the WTRU may decide to accept the solicitation and may establish a connection to the RAN, for example, to contribute resources to the Fog-RAN system.

For some embodiments, a WTRU may (e.g., decide to) accept or decline a Fog-Resource Solicitation, received in a paging message, according to a location availability. For example, an AGV/UAV-type of WTRU may be available to travel (e.g., autonomously) to a (e.g., desired, certain, configured, etc.) location requested by the Fog-RAN (e.g., for the Fog-RAN system), and the WTRU may (e.g., decide to) accept a Fog-Resource Solicitation for a resource in the (e.g., desired) location. In another example, the WTRU may be unavailable to travel (e.g., move) to the (e.g., desired) location, for example, due to a commitment to another location, and the WTRU may (e.g., decide to) decline a Fog-Resource Solicitation for a resource in the (e.g., desired) location.

For some embodiments, a WTRU may (e.g., decide to) accept or decline a Fog-Resource Solicitation, received in a paging message, according to a power status. For example, in case a WTRU power status (e.g., remaining battery power) is below a (e.g., certain threshold) level, the WTRU may decline to offer WTRU resources for the Fog-RAN (e.g., for the Fog-RAN system). In another example, in case the WTRU has a constant power supply (e.g. plugged to power utility), the WTRU may (e.g., accept to) join the Fog-RAN system.

For some embodiments, a WTRU may (e.g., decide to) accept or decline a Fog-Resource Solicitation, received in a paging message, according to a (e.g., current) mobility state (e.g., whether the WTRU is currently moving and at which speed). A WTRU may (e.g., decide) to not offer WTRU resources in case the WTRU is moving e.g., at any of a high speed, a low speed, or any other (type of) speed. For example, the WTRU may (e.g., decide to) accept a Fog-Resource Solicitation only in case the WTRU is static (e.g. not moving). In another example the WTRU may (e.g., decide to) accept a Fog-Resource Solicitation in case the WTRU is moving at a speed below a (e.g., given) level, and (e.g., decide to) decline the Fog-Resource Solicitation in case the WTRU is moving at a speed above the (e.g., given) level. A WTRU's mobility may be affected in other ways, such as, for example, an inability to move or an inability to move until a certain time.

For some embodiments, based on the WTRU's decision to join the Fog-RAN system or not, a WTRU may respond with a (e.g., positive or negative) feedback response to the network. For some embodiments, the WTRU may perform a RACH procedure to set up (e.g., establish) an RRC connection with the network. For some embodiments, the WTRU may perform a random access process (e.g., transmission) for both positive and negative responses to the network. For some embodiments, WTRUs that (e.g., decided to) decline a solicitation to join the Fog-RAN system may go into a sleep mode (e.g., an inactive mode, an RRC-Idle mode, etc.) after sending a negative response to the network. For some embodiments, WTRUs that (e.g., decided to) decline a solicitation to join the Fog-RAN system may ignore (e.g., not respond to) the Fog-Resource Solicitation and go to (or remain in) sleep mode (e.g., RRC-Idle mode) without sending any negative response to the network.

Figure 4:
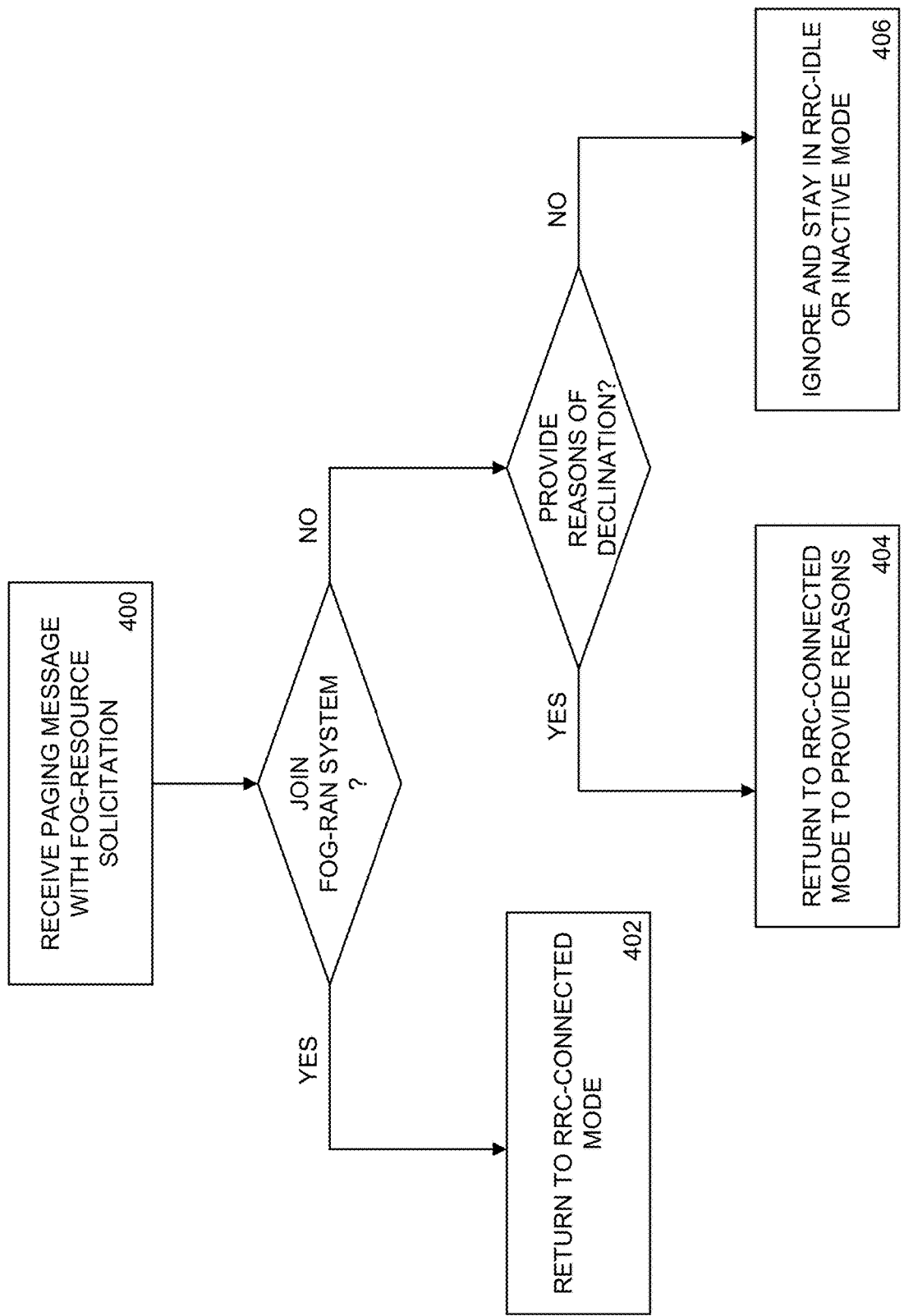
FIG. 4 is a flowchart illustrating an example process for response actions to a paging message received.

FIG. 4 is a flowchart illustrating an example process for response actions to a paging message received according to some embodiments. For some embodiments, in a step 400, a WTRU may receive a paging message including a Fog-Resource Solicitation. In case the WTRU (e.g., decides to) offer WTRU resources and joins the Fog-RAN system, the WTRU may provide (e.g., transmit a signal indicating) a positive response to the network (e.g., a gNB). The WTRU may, for example, perform conventional access procedures, which may include establishing a connection to the RAN and returning the WTRU to RRC-Connected mode in a step 402. In case the WTRU (e.g., decides to) decline the Fog-Resource Solicitation from the network (e.g., the gNB), the WTRU may connect to the network in a step 404 or the WTRU may ignore the Fog-Resource Solicitation in a step 406 and stay in RRC-Idle mode.

For some embodiments, the WTRU may connect to (e.g., establish a connection with) the network to provide (e.g., transmit) information, for example, indicating any of a negative response and the reasons why the WTRU is declining the Fog-Resource Solicitation by the network. The WTRU may provide (e.g., transmit) the information to the network via any of a grant-based and a grant-free access for some embodiments. The grant-free access may be via a RACH procedure.

For some embodiments, the WTRU may ignore (e.g., not respond to) the Fog-Resource Solicitation by the network and stay in RRC-Idle mode. For some embodiments, an alternative paging message format may be used, as described above, and the WTRU may skip receiving the paging message that includes a paging record for Fog-Resource Solicitation (e.g., only) in case the WTRU has determined that offering WTRU resources is infeasible. For example, a WTRU may determine offering resources to be infeasible in any of the following situations: no resource is available for the Fog-RAN system, the WTRU is not located in the requested location, the power status of the WTRU is below a (e.g., given) level, the WTRU is currently moving. A WTRU, having skipped receiving the paging message may not send a negative response, and the network, such as the gNB, may not expect such a response.

For some embodiments, a WTRU may (e.g., decide to) not respond to a request based on any of a configuration, an implementation, or the status of the WTRU. For some embodiments, a WTRU may determine whether to respond or not based on (e.g., several, multiple) factors, such as any of a battery charge level and a resource availability.

Providing the reasons of declination may allow the network to determine whether it may send solicitations again to a WTRU, and e.g., in which time frame. For example, in case the WTRU has a low battery charge level, the network may skip paging the WTRU for Fog-Resource Solicitation for a long time interval. In another example, in case the WTRU (e.g., currently) has insufficient resources, the network may solicit the WTRU again (e.g., after a short time interval) to determine if the WTRU has (e.g., spare) resources at a later (e.g., short) time. For some embodiments, a WTRU may send (e.g., transmit) a declination due to a mobility state of the WTRU (e.g., such as if the WTRU is moving at a speed greater than a threshold).

Signaling and Procedures for WTRU Responses

Figure 5:
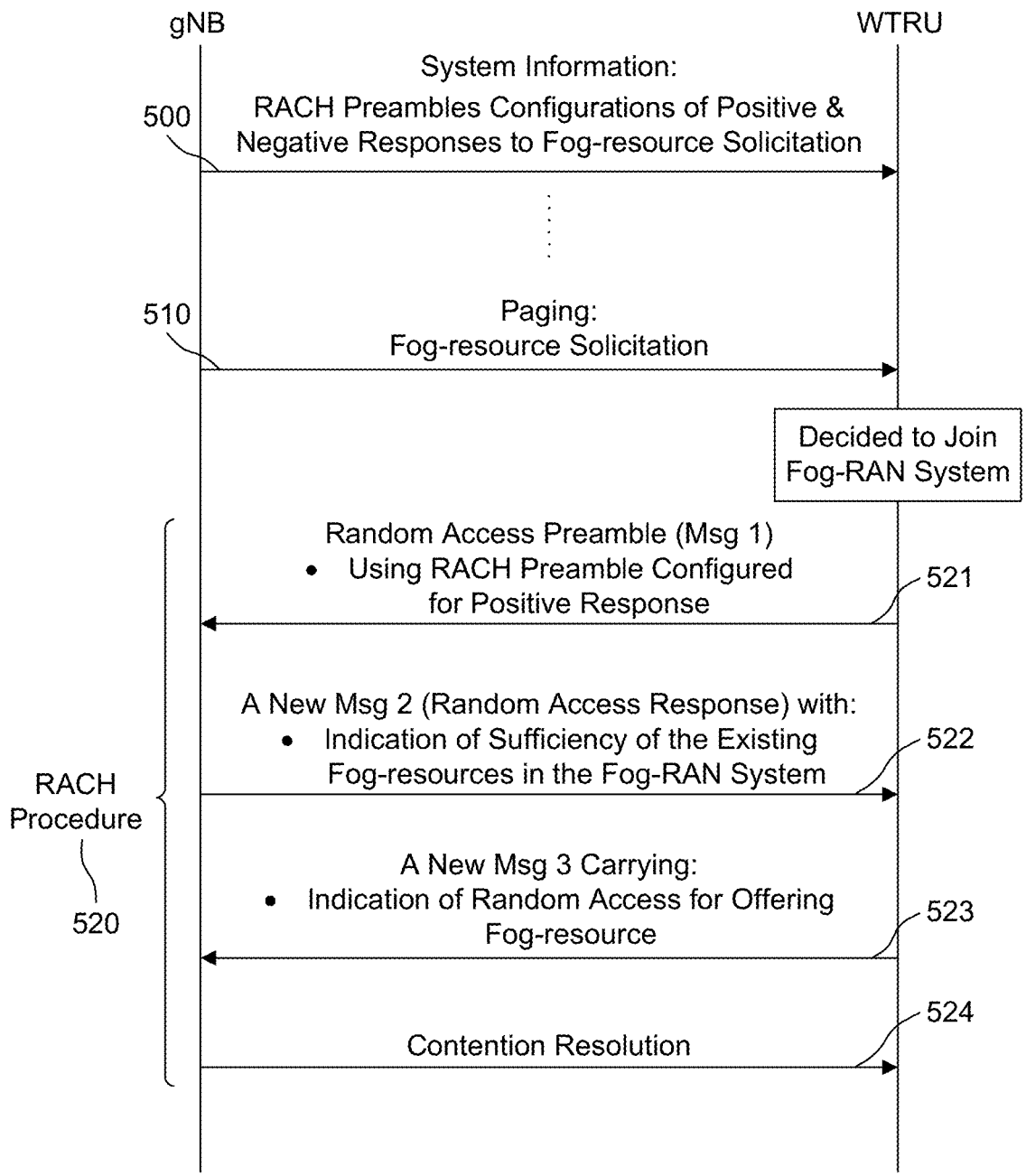
FIG. 5 is a diagram illustrating message sequencing for an example process for a WTRU to join a Fog-RAN system and use a random access channel (RACH) procedure.

FIG. 5 is a diagram illustrating message sequencing for an example process for a WTRU to join a Fog-RAN system and use a RACH procedure. For some embodiments, a gNB may send a system information 500 as, for example, RACH preamble configurations for any of positive and negative responses to a paging message with a Fog-Resource Solicitation. A WTRU may receive a configuration or be configured with any number of sets of preambles and/or any number of sets of resources (e.g., any of time and frequency resources) that may be used for a preamble or a physical random access channel (PRACH) transmission. The configuration may be via any of a broadcast signaling and a dedicated signaling. The configuration may be sent via any of a system information and an RRC signaling. A first set of preambles may correspond to a positive response. A second set of preambles may correspond to a negative response. The sets of preambles may be subdivided further such that subsets of preambles may correspond to reasons for declining or WTRU capabilities to support the Fog-Resource Solicitation. For example, a declining subset may indicate any of a WTRU location issue and insufficient resources. Another declining subset may indicate a low WTRU battery level (e.g., below a threshold). A WTRU, responding to a Fog-Resource Solicitation 510, may determine a response (e.g., any of acceptance, declination and cause) and may select a preamble within the set or subset of preambles, for example, for indicating the WTRU's determined response. The selection may be random within the set or subset of preambles corresponding to a same indication. For example, any of a set and a subset of preambles may be a single (e.g., specific) preamble. The WTRU may transmit the selected preamble 521.

As shown in FIG. 4, in case the WTRU (e.g., decides to) accept the solicitation from the network (e.g., decides to join the Fog-RAN system) to offer WTRU resources for operations of the Fog-RAN system, the WTRU may return to and/or enter connected mode (e.g., RRC-Connected mode) via conventional network random access channel procedures (such as e.g., by establishing a connection to the RAN). Indicators in messages of the RACH procedure may be used (e.g., transmitted) to facilitate efficiency and network management. A RACH procedure 520 may include an exchange of any number of messages, such as for example a first message 521, a second message 522, a third message 523, a fourth message 524 and a fifth message (not shown on FIG. 5), which may be referred to herein respectively as Msg 1, Msg 2, Msg 3, Msg 4, and Msg 5. The first message (Msg 1) 521 may be exchanged before the second message (Msg 2) 522, which may be exchanged before the third message (Msg 3) 523, which may be exchanged before the fourth message (Msg 4) 524, which may be exchanged before the fifth message (Msg 5).

For some embodiments, establishing an RRC connection may include the WTRU sending any of a PRACH preamble and a RACH preamble. Sending such a preamble may be referred to as sending the first message (Msg 1) 521 of a RACH procedure 520. For some embodiments, the resources (e.g., any of time and frequency resources) on which the WTRU may transmit a preamble, may be configured (e.g., instead of or in addition to resources used) to indicate any of a positive response, a negative response and a reason associated with a positive or negative response. A WTRU, responding to a Fog-Resource Solicitation 510 (e.g., request), may determine a response (e.g., any of acceptance, declination and cause) and may select any of a preamble and a transmission resource, e.g., any of a time and a frequency resource that may indicate the WTRU's determined response. The selection may be random within a set or subset of preambles/transmission resources (corresponding to a same indication). The WTRU may transmit a preamble 521 on the selected resource. For example, any of a set and a subset of preamble/transmission resources may be a single (e.g., specific) preamble/transmission resource.

For some embodiments, the network, (e.g., a gNB) may send (e.g., Fog-Resource) solicitations 510 via paging to a (e.g., large) group of WTRUs for offering their Fog-Resources. The WTRUs may (e.g., make decisions and) reconnect to the network at different times. The network may have already fulfilled (or allocated) resources to handle a Fog-Resource Solicitation (e.g., request) before receiving responses from some of the WTRUs, for example, before some WTRUs begin the RACH procedure 520. An indicator e.g., transmitted by the gNB, in the random access response (RAR) 522 may indicate the sufficiency of the existing Fog-RAN system (or may indicate whether a Fog-Resource Solicitation request is still unfulfilled). The RAR message 522 may be referred to as the second message (Msg 2) of the RACH procedure. For example, the network may transmit an information in the RAR message 522, indicating the network already collected an amount of Fog-Resources corresponding to a Fog-Resource Solicitation 510. A WTRU, receiving such information in the RAR message 522 and attempting to access (or connect to) the network to provide Fog-Resources may terminate the process and return to an idle (e.g., RRC-Idle) mode.

A WTRU may attempt to connect or attach to the network for various reasons. For example, a WTRU may initiate an RRC Connection establishment process (e.g., send an RRC Connection request 523) for multiple reasons (or causes), such as any of mobile-originated signaling, data, and mobile-terminating access (e.g., a response to a regular page). The third message (Msg 3) of the RACH procedure (e.g., random access procedure) may be an RRC Connection Request 523.

For some embodiments, information may be included (or added) to an RRC Connection Request 523 (e.g., Msg 3 of the RACH procedure) to indicate that the cause of the RRC Connection request 523 (e.g., a connection setup request) is a response to a Fog-Resource Solicitation 510. For example, an establishment cause may be included and/or added for a response to a Fog-Resource Solicitation 510. For example, the information and/or establishment cause may be (or may correspond to) a positive response (e.g., only a positive response) to a Fog-Resource Solicitation 510. In another example, the information or establishment cause may indicate a positive or negative response. Additional information may be included in the RRC Connection Request 523, such as, for example, a reason for declining. For some embodiments, additional information may be provided in a later communication, for example in a fifth (e.g., subsequent) message Msg 5 (not represented) of the RACH procedure 520. Information related to a response to a Fog-Resource Solicitation 510 may be included in any of the body and the header of a message 521, 523.

For some embodiments, including information related to Fog-Resource Solicitation in the RRC Connection Request (Msg 3) and/or other parts or messages of the RACH procedure may be applicable (e.g., only) to WTRUs that have been solicited by the network for offering Fog-Resources within a time interval (for example before a timer expires). In case the WTRU does not perform a random access within a time interval after the paging message (for a Fog-Resource Solicitation) is sent or received, and in case the WTRU performs a random access after the time interval, the network may process the random access for a purpose other than for offering the WTRU's Fog-Resources.

FIG. 5 illustrates an example of a positive response from a WTRU. The gNB may configure any number of subsets of RACH preambles and/or PRACH resources for any of positive and negative responses, by transmitting a System Information 500. In case the WTRU is paged with (e.g., receives a paging message including) a Fog-Resource Solicitation 510, the WTRU may perform a random access transmission 521 using any of a preamble and a resource (e.g., any of a time and a frequency resource) within the subset that was (e.g., previously) configured for indicating a positive response (Msg 1). The gNB may respond with a RAR 522 (Msg 2) that may indicate whether the network has sufficient Fog-Resources. The WTRU may transmit an information in the third message 523 (Msg 3), indicating that the WTRU is performing random access to offer Fog-Resources. For a WTRU with a negative response, the procedure may terminate after the WTRU has sent the first message 521 (Msg 1) indicating the declination of the Fog-Resource Solicitation. For example, the procedure may terminate because the RACH preamble may be sufficient (e.g., alone) to indicate a declination. For some embodiments, the gNB may send a contention resolution message 524 to the WTRU to acknowledge decoding of the RACH preamble.

Fog-RAN System Participation after RACH Procedures

Figure 6:
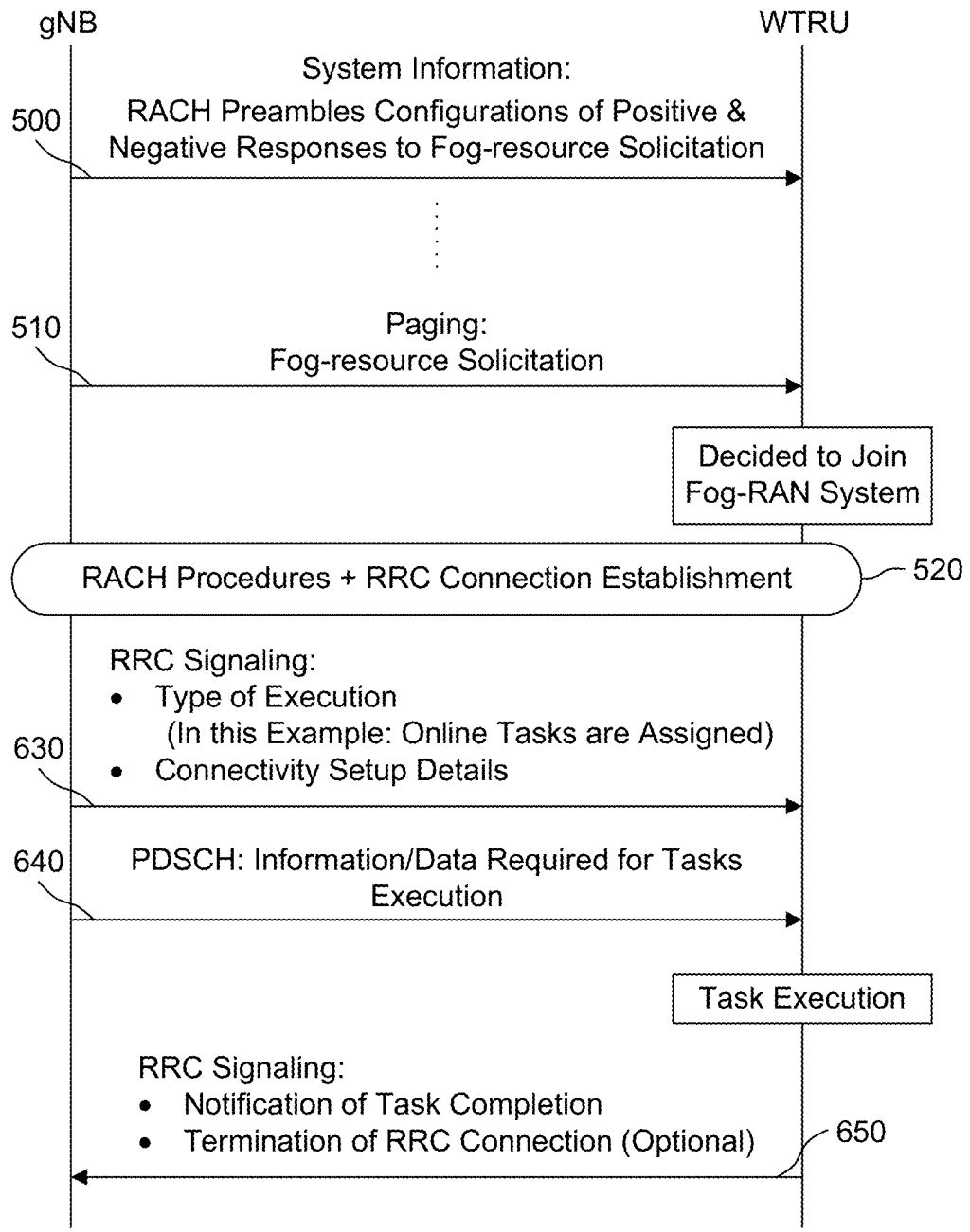
FIG. 6 is a diagram illustrating message sequencing for an example process for a WTRU to join a Fog-RAN system and establish an RRC connection with assignment of online tasks.

FIG. 6 is a diagram illustrating message sequencing for an example process for a WTRU to join a Fog-RAN system and establish an RRC connection with assignment of (e.g., online, connected mode, RRC-Connected mode, offline, idle mode, RRC-Idle mode, etc.) tasks. For some embodiments, the network (e.g. gNB) may provide (e.g., transmit) information relating to tasks assigned to the WTRU. The information may be provided, for example via RRC signaling 630. The information may be provided (e.g., transmitted) after setup of the RRC connection, e.g., following the completion of RACH procedure 520.

For some embodiments, the network (e.g., gNB) may provide (e.g., transmit) and/or the WTRU may receive (e.g., in an RRCConnectionReConfiguration Message) any of the type of execution and connectivity setup details. At least two types of tasks may be executed by a WTRU: online tasks and offline tasks. For executing online tasks, the WTRU may be in or may stay in connected mode (e.g., RRC-Connected mode). Examples of online tasks may include any of virtualized network functions and signal processing operations. The WTRU may execute offline (e.g., idle mode) tasks without being in or staying in a connected mode. For example, a WTRU in idle mode may execute an offline task. For example, the network may provide a set of collected data, which may be analyzed by the WTRU offline (such as any of model training for machine learning and deep learning for performing artificial intelligence (AD-driven network operations).

When (e.g., after) tasks, such as online tasks, are assigned (e.g., by a network node such as a base station or gNB) to Fog-Resources belonging to a WTRU, the WTRU may setup connectivity to any number of nodes (e.g., WTRUs) other than the network node (e.g., base station or gNB) that assigned the tasks. For example, in case the WTRU is assigned (e.g. requested) to perform certain functionalities or signal processing operations for other WTRUs, a device-to-device (D2D) link may be set up to enable such distributed computing. The network (e.g., a node such as the gNB), may provide the WTRU with connectivity setup details (e.g., parameters) about how the connectivity may be initialized (e.g., in RRC signaling, such as the RRC signaling that assigned the online task(s)).

The WTRU may receive the information and/or data 640 that the WTRU may use (or need) for the assigned tasks via any of a shared channel, such as any of a PDSCH, and a subframe based communication (e.g., transmission). For tasks with short (e.g., strict, bounded) latency, the traffic (e.g., information and/or data) associated with these tasks may be sent or received using any of a short PDSCH (sPDSCH), a short transmission time interval (sTTI), a slot-based transmission, a symbol-based transmissions, and configurations for URLLC.

For some embodiments, such as for online tasks, the WTRU may terminate (e.g., release) a connection (e.g., the RRC connection) subsequent to (e.g., once, after) the tasks are completed. The WTRU may send a request 650 (e.g., to the network) for RRC connection release or termination. In case the WTRU completes the task(s), the WTRU may send the results to the network and/or indicate that the WTRU has completed the task(s). Subsequent to the WTRU transmitting and/or the network receiving any of (i) the results, (ii) the indication of WTRU completion, and (iii) the RRC connection release request, the network may release or terminate the RRC connection (e.g., by sending an RRC connection release message to the WTRU). The WTRU may terminate or release the connection (e.g., the RRC connection) after receiving the RRC connection release message.

For some embodiments, the WTRU may send an indication (e.g., transmit a signal indicating) to the network that the WTRU is (e.g., autonomously) terminating (e.g., releasing) the connection (e.g., the RRC connection). For some embodiments, after sending the indication, the WTRU may terminate the connection. For example, the WTRU may terminate the connection after an amount (e.g., a configurable amount) of time has elapsed, for example, after the termination of the task.

For some embodiments, such as for offline tasks, the WTRU may return to an idle mode (e.g., RRC-Idle mode) after the tasks are assigned. The WTRU may conduct access procedures (e.g., a random access procedure) to report and/or provide (e.g. transmit a signal indicating) the tasks' execution results. The WTRU may use any of conventional (e.g., grant-based transmission) and grant-free random access procedures.

WTRU-Triggered RRC-Connection Release Request

Termination of a RRC connection after task completion is shown in FIG. 6. A WTRU connecting (e.g., connected) to the network for (e.g., executing a task for) supporting a Fog-RAN (e.g., a Fog-RAN system) may terminate the (e.g., RRC) connection for various reasons. For example, such reasons for terminating the (e.g., RRC) connection may include any of: the WTRU completing the execution of the assigned tasks; the WTRU supporting the WTRU's other activities that may use the WTRU's resources (currently devoted to the assigned task); and the WTRU's battery level (e.g., dropping below a threshold).

Figure 7:
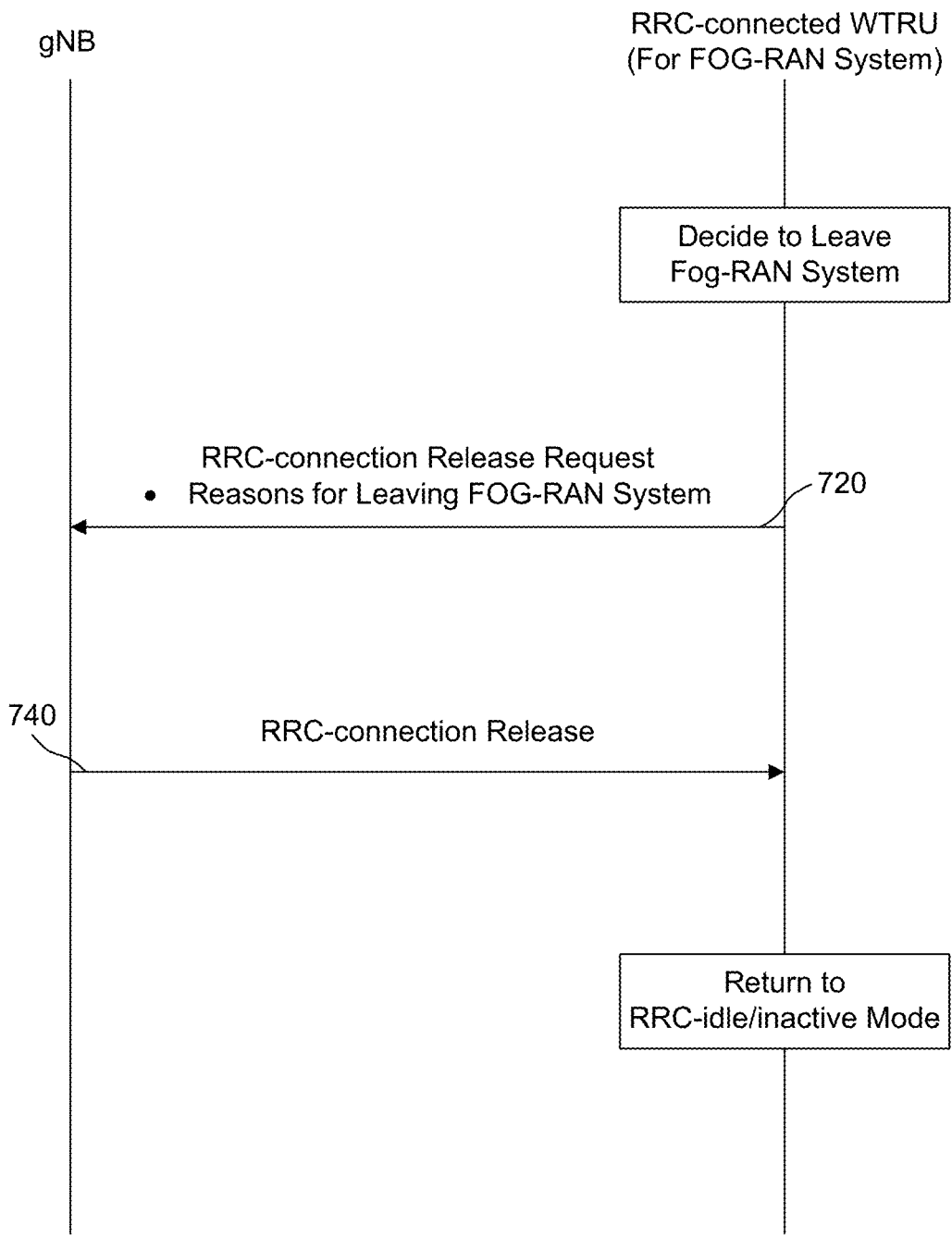
FIG. 7 is a diagram illustrating message sequencing for an example process for an connected WTRU to leave the Fog-RAN system.

FIG. 7 is a diagram illustrating message sequencing for a process for a connected (e.g., an RRC-Connected) WTRU to leave the Fog-RAN system by a WTRU-triggered connection (e.g., RRC-Connection) release request. For some embodiments, a WTRU-Triggered RRC-Connection Release Request 720 may be sent to a gNB by an RRC-Connected WTRU (e.g., a WTRU connected to the Fog-RAN system). The (e.g., RRC-Connection Release) request 720 may terminate the WTRU's connection to the network. For some embodiments, the (e.g., RRC-Connection Release) request 720 may include any of the reasons and causes indicating why the WTRU is disconnecting from the network. In response to the RRC-Connection Release Request 720, the gNB may send an RRC-Connection Release 740 to the WTRU. The WTRU may return to an idle mode (e.g., RRC-Idle mode, inactive mode, etc.). Providing the network with reasons (for leaving the Fog-RAN system) before entering an idle mode (e.g., RRC-Idle mode) may allow the network to determine whether to solicit the WTRU with a subsequent (e.g., further) Fog-Resource Solicitation, for example, in the near future and/or in which time frame.

Some embodiments of a method may include: receiving at WTRU a request to join a Fog-Radio Access Network (RAN) platform; determining if the request applies to the WTRU; deciding whether to accept the request; performing an access procedure to indicate a declination of the request if the decision to accept the request is a declination of the request; and establishing a connection to the RAN if the decision is an acceptance of the request.

For some embodiments, the request to join the Fog-RAN system may be a paging message.

For some embodiments, the paging message may include a paging record for a Fog-Resource Solicitation.

For some embodiments, the paging message further may include additional information related to the Fog-Resource Solicitation.

For some embodiments, the additional information may include any of a desired location, at least one type of task to be executed, and a minimum threshold for a resource parameter.

For some embodiments, establishing the connection to the RAN may include a RACH procedure.

For some embodiments, the RACH procedure may include: sending by the connecting WTRU a positive response to the request; receiving from the connecting WTRU an acceptance of the connecting WTRU; and sending to the connecting WTRU a connection request to join the RAN.

For some embodiments, the positive response to the request may be a RACH preamble configured for the positive response.

For some embodiments, the acceptance of the connecting WTRU may be a response to the RACH preamble.

For some embodiments, the connection request may indicate a cause for the connection request.

Some embodiments may further include maneuvering to a location if the decision is an acceptance of the request.

For some embodiments, the location may be within a proximity of a desired location for the WTRU.

For some embodiments, the request may be a paging message, and the paging message may include the desired location.

Some embodiments of an apparatus may include: a processor; a non-transitory computer-readable medium storing instructions that are operative, when executed by the processor, to perform one or more of the actions and methods described herein.

Some embodiments of a method may include: determining a resource requirement for a Fog-Radio Access Network (RAN) platform; identifying any number of WTRU capable of handling the resource requirement; sending a request to the any number of WTRUs to join the Fog-RAN system; receiving a response from a connecting WTRU included in the sent request; and establishing a connection to the RAN if the response is an acceptance of the request.

For some embodiments, the request to join the Fog-RAN system may be a paging message.

For some embodiments, the paging message may include a paging record for a Fog-Resource Solicitation.

For some embodiments, the paging message may further include additional information related to the Fog-Resource Solicitation.

For some embodiments, the additional information may include any of a desired location, at least one type of task to be executed, and a minimum threshold for a resource parameter.

For some embodiments, establishing the connection to the RAN may include performing a RACH procedure with the connecting WTRU.

For some embodiments, the RACH procedure may include: sending by the connecting WTRU a positive response to the request; receiving by the connecting WTRU an acceptance of the connecting WTRU; and sending by the connecting WTRU a connection request to join the RAN.

For some embodiments, the positive response to the request is a RACH preamble may be configured for the positive response.

For some embodiments, the acceptance of the connecting WTRU may be a response to the RACH preamble.

For some embodiments, the connection request may indicate a cause for the connection request.

Some embodiments of an apparatus may include: a processor; a non-transitory computer-readable medium storing instructions that are operative, when executed by the processor, to perform one or more of the actions and methods described herein.

Some embodiments of a method may include: receiving at a WTRU a request to join a Fog-Radio Access Network (RAN) platform; deciding whether to accept the request; sending a declination message if the decision to accept the request is a declination of the request; and sending an acceptance message if the decision is an acceptance of the request.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method comprising:
   receiving by a wireless transmit/receive unit (WTRU), from a Radio Access Network (RAN), in a paging message, a request for a fog resource for performing a task by the WTRU, the request comprising information indicating any of an amount of resources, a task type, and a target location;
   determining by the WTRU whether to provide the requested fog resource according to any of an availability of the amount of resources associated with the WTRU, a capability of the WTRU to execute the task type, and a location of the WTRU; and
   transmitting, by the WTRU, a random access channel (RACH) transmission indicating a response to the request according to said determining.

2. The method according to claim 1, wherein the request for the fog resource is a Fog-Resource Solicitation.

3. The method according to claim 1, wherein the request for the fog resource comprises a paging record for a Fog-Resource Solicitation.

4. The method according to claim 1, wherein said requested fog resource is any of a computing resource, a networking resource and a storage resource.

5. The method according to claim 1, wherein the determination to provide the requested fog resource is further according to any of a power level of the WTRU and a mobility state.

6. The method according to claim 1, wherein the RACH transmission comprises a preamble selected from a plurality of preambles.

7. The method according to claim 6, wherein the plurality of preambles comprises a first set of preambles corresponding to a positive response such that the RACH preamble is selected from the first set of preambles indicating the positive response to the request.

8. The method according to claim 1, wherein the WTRU is maneuvering to the target location in a case where the response is the positive response.

9. The method according to claim 6, wherein the plurality of preambles comprises a second set of preambles corresponding to a negative response such that the RACH preamble is selected from the second set of preambles indicating the negative response to the request.

10. The method according to claim 9, wherein the second set of preambles comprises a plurality of subsets corresponding to different reasons such that the RACH preamble is selected from a subset of the second set of preambles further indicating a reason for the negative response.

11. The method according to claim 10, wherein the reason for the negative response is any of a denied permission, a location availability, a resource availability and a power level.

12. A wireless transmit/receive unit (WTRU) comprising a transmitter, a receiver, a processor and a memory, the WTRU being configured to:
   receive, from a Radio Access Network (RAN), in a paging message, a request for a fog resource for performing a task by the WTRU, the request comprising information indicating any of an amount of resources, a task type, and a target location;
   determine whether to provide the requested fog resource according to any of an availability of the amount of resources for performing the task by the WTRU, a capability of the WTRU to execute the task type, and a location of the WTRU; and
   transmit a random access channel (RACH) transmission indicating a response to the request according to said determining.

13. The WTRU of claim 12, wherein the request for the kg resource is a Fog-Resource Solicitation.

14. The WTRU of claim 12, wherein the request for the kg resource comprises a paging record for a Fog-Resource Solicitation.

15. The WTRU of claim 12, wherein said requested fog resource is any of a computing resource, a networking resource and a storage resource.

16. The WTRU of claim 12, wherein the determination to provide the requested fog resource is further according to any of a power level of the WTRU and a mobility state.

17. The WTRU of claim 12, wherein the RACH transmission comprises a RACH preamble selected from a plurality of preambles.

18. The WTRU according to claim 17, wherein the plurality of preambles comprises a first set of preambles corresponding to a positive response such that the RACH preamble is selected from the first set of preambles indicating the positive response to the request.

19. The WTRU according to claim 17, wherein the plurality of preambles comprises a second set of preambles corresponding to a negative response such that the RACH preamble is selected from the second set of preambles indicating the negative response to the request.

20. The WTRU according to claim 19, wherein the second set of preambles comprises a plurality of subsets corresponding to different reasons such that the RACH preamble is selected from a subset of the second set of preambles further indicating a reason for the negative response.

\* \* \* \* \*